Patented May 9, 1944

2,348,639

UNITED STATES PATENT OFFICE 2,348,639

IDENTIFYING SUBSTANCE

Jolly W. O'Brien, Houston, Tex.

No Drawing. Application September 30, 1941,
Serial No. 412,962

2 Claims. (Cl. 252—8.5)

The invention relates to a means of determining the rate of flow of liquids in inaccessible locations and of identifying any particular increment of a flowing liquid by introducing an identifiable material into the liquid.

In the drilling of wells by the rotary method where a drilling fluid or mud is circulated into and out of the well bore it is often desirable to determine the volume of mud circulating in the well, the rate of circulation, or to otherwise identify a particular increment of the fluid as it emerges from the well. It is also desirable in some instances to identify a portion of a stream of liquid flowing in a pipe line trench or to otherwise identify a particular location in a flowing stream of the fluid.

Various materials have been utilized in attempting to maintain an identifiable characteristic in various types of liquids while they are flowing, but it has been found that the usual identifying substances, such as dyes, are quickly absorbed by the liquid and particularly if the liquid contains any clay particles such as in a drilling fluid. The identifying material thus quickly loses its identity and becomes so dissipated in the liquid that it no longer serves its purpose. It has been found especially difficult to provide any identifying material for use in crude oils and in drilling muds.

It has been found that a very satisfactory and suitable identifying material can be compounded by making a mixture of benzidine and montmorillonite clay when these two materials are mixed in the form of a slurry with water.

It is therefore one of the objects of the invention to provide a slurry of benzidine and montmorillonite clay.

Another object of the invention is to provide a material for addition to a flowing liquid so as to identify a particular batch or location in the liquid, which material will have a characteristic color.

Still another object of the invention is to provide a material for identifying the flow of fluid which has the peculiar characteristic of displaying one color when wet and a different color when dry.

Still another object of the invention is to provide a viscous gel-like identifying material to be added to liquids which will retain these characteristics during circulation with the liquid.

Still another object of the invention is to provide a slurry composed of approximately one part, or less, of benzidine, 99 parts, or more, of montmorillonite clay, and sufficient water to form a viscous gel-like slurry.

It has been found that the material benzidine, when mixed with clay of the montmorillonite group in the presence of water, exhibits unexpected characteristics. The benzidine is a granular material of a very dark brown color; it is slightly soluble in water, exhibiting no color change or other characteristics when dissolved in water. When, however, a finely ground clay of the montmorillonite group is added to the solution of water and benzidine, it has been found that the clay and the mixture thus compounded turns a dark blue. The exact reaction causing this unexpected color change is not known at present, but it has been discovered that such a change occurs, and it has also been discovered that when a mixture of the benzidine in water and the clay of the montmorillonite group is permitted to dry so that the water evaporates, that the color again changes to a brilliant yellow.

In practicing the present invention as applied to drilling muds, crude oils, and similar materials, a slurry is made up of benzidine in water and clay of the montmorillonite group. This slurry will preferably be rather viscous and will have gel-like characteristics. When a quantity of this slurry is introduced into a flow stream of drilling mud, crude oil, or other liquid it has been found that this batch of material, due to its viscous and gel-like characteristics, remains intact as a batch, and due to its brilliant color can be readily detected in the flowing stream. Thus if it is desirable to determine the time or volume of flow in a well being drilled by the rotary method, a quantity of this identifiable slurry may be introduced into the stream of mud being pumped into the well. The return line or discharge stream from the well can be observed and the brilliant blue color of the identifiable slurry can be readily detected when it emerges from the well. The same is true of the flow from ditches, pipe lines, etc. One of the particular characteristics of the material is that it is of such a distinguishing color that it can be readily observed in a dark colored liquid, such as mud or crude oil, and still another characteristic, as has been indicated above, is present in that samples of the slurry turn a brilliant yellow when permitted to evaporate. Thus samples of the material when dried will turn yellow and retain this characteristic for identification.

If it is desired that the time of circulation or distance of flow be determined, the rate of flow and the time thereof can be noted and calculated to determine the various data which is desired. The volume can, of course, be computed by determining the rate of pumpage, and it seems obvious that various calculations and observations can be made to obtain the information desired.

It has been found that the slurry can be made up in various proportions varying from $\frac{1}{10}$ of 1% benzidine and $99\frac{9}{10}$% of clay, to other proportions including greater percentages of benzidine and less percentages of clay.

Various quantities of the benzidine and clay can be mixed with water, and for purposes of illustration, I have found that from 5— to 10% of these solids, when mixed with water, form a suitable slurry having viscous gel-like characteristics.

It is understood that benzidine is a crystalline-like substance having the approximate formula $NH_2C_6H_4—C_6H_4NH_2$. This compound may be prepared by reducing para-dinitrodiphenyl by zinc dust in an alkaline solution which results in a crystalline material which may be used in powdered dry form. The clay of the montmorillonite group can be finely ground and has the empirical formula of $Al_2O_3.4SIO_2.H_2O$. This clay is of an absorbing nature.

Broadly, the invention contemplates an identifying material which can be easily observed due to its viscous and gel-like characteristics whereby it clings together as a batch and exhibits brilliant blue color when wet and a different color when dry.

What is claimed is:

1. A method of detecting the circulation of drilling fluid in a well bore which comprises introducing an identifiable substance into the entering stream of fluid which substance is composed of benzidine, water, and montmorillonite clay and has the characteristics of a viscous slurry capable of remaining closely compacted and is substantially nondiffusible in the drilling fluid and detecting a clear blue color of the material when wet, and ascertaining a brilliant yellow color of the material after drying.

2. An identifiable drilling fluid for circulation in a well bore in the rotary method of drilling comprising a mud slurry made up of montmorillonite clay, a weighting material, and water and a small but a sufficient percentage of benzidine so that the slurry has a blue color when in a wet stage and yellow when dried and such fluid has the property of remaining compacted so as to be readily identified in circulation.

JOLLY W. O'BRIEN.